July 27, 1965   W. D. SCHAEFFER   3,197,525
CLATHRATION PROCESS
Filed Aug. 7, 1961
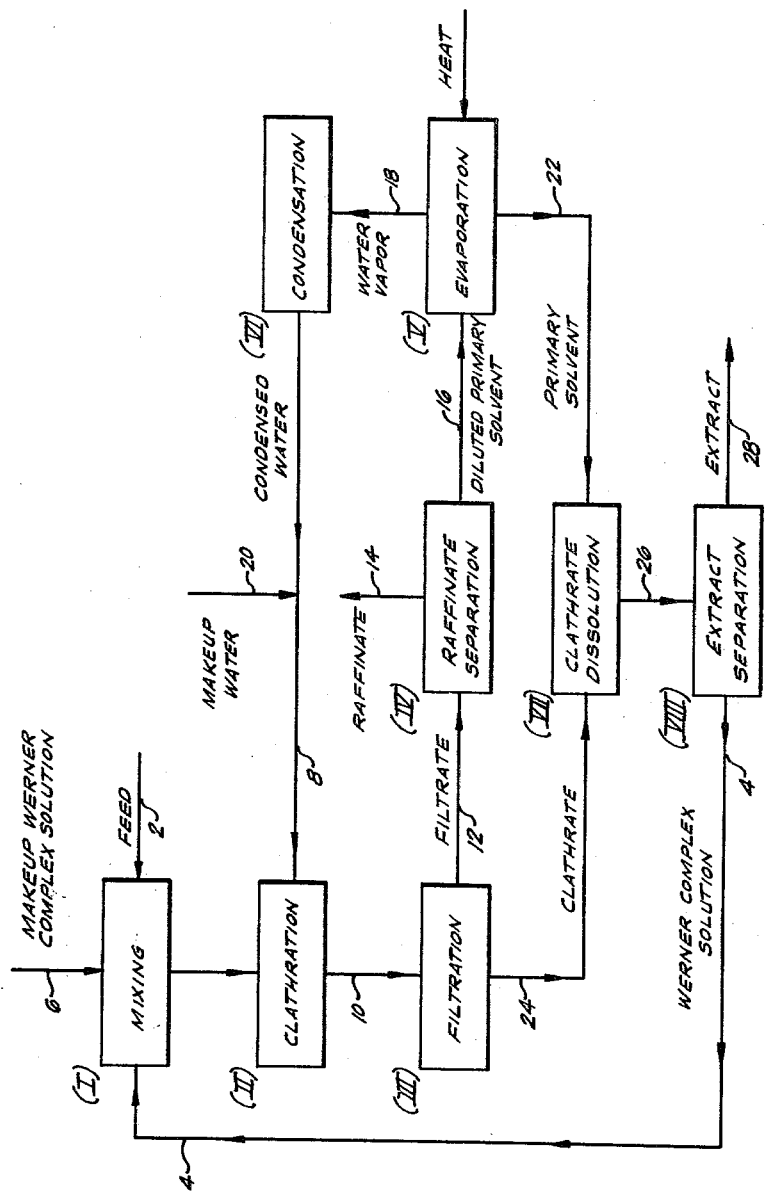
INVENTORS
WILLIAM D. SCHAEFFER
BY
John H. Crowe
AGENT 3,197,525
CLATHRATION PROCESS
William D. Schaeffer, Pomona, Calif., assignor to Union Oil Company of California, Los Angeles, Calif., a corporation of California
Filed Aug. 7, 1961, Ser. No. 129,653
5 Claims. (Cl. 260—674)

This invention relates to a method for separating difficulty separable compounds such as isomers or the like by selective clathration with Werner complexes in alkaline solvent media. The method, and this is its essence, achieves alteration of the solvent properties of primary solvent media, to render them capable of alternately precipitating and dissolving clathrates, by the alternate addition of water to and the removal of water from the primary solvent as the needs of the system dictate.

The general concept of separating difficulty separable compounds by clathration techniques employing Werner complexes is not new. In this connection, attention is directed to U.S. Patent No. 2,798,891 which sets forth the basic discovery involved here, namely, that certain organic Werner complexes are capable of selectively occluding, either during or after formation of their crystalline structures, certain organic compounds, while other organic compounds of similar chemical and physical properties are occluded to a much smaller extent or not at all. The specific explanation for this phenomenon is not known with certainty, but present information indicates that it can be explained on the basis of clathrate formation between the occluded material and the Werner complex. In any event, the use of Werner complexes of the type mentioned for the separation of mixtures of organic compounds by selective occlusion of certain components will, for simplicity's sake, and in accordance with customary practice among chemists, be herein identified in clathration terms.

One technique for carrying out clathration operations with Werner complexes such as those described in U.S. 2,798,891, adverted to above, is to contact the feed mixture to be separated with a solution of the Werner complex in a primary solvent consisting of an aqueous solution of a relatively strong nitrogen base such as ammonia, an alkanolamine, or the like. Under ideal circumstances, this technique operates as follows: (1) the feed mixture and Werner complex are subjected to intimate contact in an aqueous liquid medium which is then environmentally altered in such fashion as to cause solid clathrate (of Werner complex and a selected fraction of the feed) to precipitate out; (2) the solid clathrate is physically removed from the system and the remaining liquid is then separated into a raffinate phase and an aqueous phase; and (3) the solid clathrate is redissolved in the aqueous phase from step (2), to release the clathrated feed material as an extract product, by a reversal of the environmental alteration procedure of step (1).

In past attempts to carry out the above-noted clathration technique, difficulties have been experienced in efforts to arrive at a simple and practical means of effecting the kind of reversible environmental alteration thereby required. The present invention furnishes such a means by providing for the alternate dilution and concentration of the aqueous liquid cathration media through the simple expedient of alternately adding water to and removing it from said media. Briefly, this invention entails the addition of dilution water to the feed material-Werner complex solution mixture of step (1), supra, to bring about precipitation of the clathrate, and the reverse procedure of evaporating, or otherwise removing, water from the system to regenerate the primary solvent, and thus make possible solution of the solid clathrate in accordance with step (3), supra.

It is thus a principal object of this invention to provide a practical clathration method for separating difficulty separable compounds by means of the simple and inexpensive environmental alteration technique whereby clathrates can be easily precipitated from and redissolved in clathration media to permit separation and recovery of raffinate and extract products from the system at will.

Other objects and advantages of the invention will be apparent from the complete description thereof which follows.

One of the preferred Werner complexes for use in clathration processes of the instant type, is nickel tetra-(4-methylpyridine)dithiocyanate. This material has been disclosed in U.S. Patent 2,798,891, as well as in a number of copending patent applications of which we are aware, as a particularly effective Werner complex for clathration purposes. Hereinafter, in the interests of greater brevity, 4-methylpyridine will be abbreviated as 4MP, and nickel tetra(4-methylpyridine)dithiocyanate will be symbolically referred to as $Ni(4MP)_4(SCN)_2$. Also, the basic Werner complex substituent, as exemplified by the aforesaid 4MP, will be generically referred to as the Werner amine, and the remaining portion of the Werner complex, such as the $Ni(SCN)_2$ in $Ni(4MP)_4(SCN)_2$, will be referred to as the Werner salt.

As previously indicated, in the improved clathration method of this invention the Werner complex is employed in the form of a solution in a primary solvent. The primary solvents suitable for such utility are those aqueous alkaline solutions containing, as alkaline constituents, nitrogen bases of lower volatility than water such as, for example, aqueous solutions of alkanolamines, piperidine, or the like, which may or may not contain buffer salts (such as ammonium salts). These primary solvents will be discussed and identified in greater detail hereinafter.

The present invention will be more completely understood by reference to the accompanying drawing which schematically illustrates one technique for the practice of our new clathration method. Turning now to the drawing, feed to be resolved is introduced through line 2 and recycle Werner complex solution is introduced through line 4, from a source hereinafter disclosed, to mixing step (I). Makeup Werner complex solution is fed to step (I) through line 6 as needed.

The step (II) clathration is effected by introducing water into the mixed material from step (I), through line 8, from a source hereinafter identified. The addition of the water causes the precipitation of solid clathrate of the Werner complex and the more readily clathrated portion of the feed mixture. The less readily clathrated part of the feed remains in liquid form in the mixture. It is not to be inferred that mixing step (I) and clathration step (II) are always carried out as separate and distinct operations. Thus it is within the scope of our invention to bring together the Werner complex solution, feed and dilution water simultaneously under such conditions as to accomplish the mixing and clathration concurrently, or substantially so. It is likewise within the scope of the invention to combine one or both of steps (I) and (II) with filtration step (III), discussed infra, if desired.

While I do not wish to be bound by any theoretical explanation of the reason why the solid clathrate precipitates in clathration step (II) it is my feeling that such explanation is a fairly simple one. It is known by those skilled in the art that Werner complexes of the type under present consideration are insoluble in water and that they are soluble in alkaline primary solvents because the relatively strong nitrogen base present in such solutions competes with the relatively weak Werner amine for the nickel, or equivalent metal, from the Werner salt, and, by virtue of its unshared pair of nitrogen electrons, forms a water soluble coordination complex therewith. The addition of water to the primary solvent in clathration step (II) dilutes the solvent until, after a sufficient amount of water has been added, it has been converted to an aqueous liquid more nearly resembling water than an alkaline solution at which point the solubility of the clathrate becomes so low that is precipitates out as a solid. In view if this, it seems apparent that the amount of water added in clathration step (II) must be adequate to convert the primary solvent to a state sufficiently resembling water to assure substantially complete precipitation of the clathrate from solution. Since the alkaline nitrogen base will always be present, regardless of the degree of dilution, there will normally be traces of clathrate which do not precipitate. However, these can be kept to a minimum by proper control of the amount of water added to the system.

The slurry from clathration step (II) is transferred via line 10 to filtration step (III) for purposes of separating the liquid from the solid phase. Other means of separating solids from liquids, such as, for example, settling or centrifuging procedures, may be used in place of the filtration, if desired.

The liquid filtrate from step (III) is transferred via line 12 to raffinate separation step (IV) where the non-clathrated portion of the feed is allowed to stratify and separate. Such stratification is a normal feature of our process since the feed mixtures are of an organic nature, as emphasized hereinafter, and usually consist of hydrocarbons insoluble in water or aqueous solutions. The liquid phases from step (IV) are a raffinate phase of non-clathrated feed material and an aqueous phase of diluted primary solvent.

The raffinate phase from step (IV) is withdrawn to storage or other disposition via line 14. The diluted primary solvent phase from step (IV) is transferred via line 16 to evaporation step (V). In evaporation step (V), water substantially equivalent in amount to that added in clathration step (II) is evaporated from the diluted primary solvent phase, preferably by heating the mixture. The water from step (V) is passed to condensation step (VI) through line 18 as shown. The condensed water from step (VI) to recycled to clathration step (II) through line 8. Makeup water, to compensate for losses, is fed into the system through line 20 as needed.

There is normally dissolved in the raffinate phase of the filtrate from filtration step (III) a small amount of Werner amine. In order to recover this Werner amine for reuse in the system, various recovery techniques have been integrated with or incorporated into raffinate separation step (IV). It is within the scope of this invention to employ such techniques, one being the use of an organic secondary solvent which dissolves the non-clathrated feed material and Werner amine from the filtrate. Another, and more preferable technique, is to employ a secondary solvent in conjunction with an organic acid in such fashion as to effect a recovery of the Werner amine. Methods of using these materials will be discussed in greater detail hereinafter.

The liquid product from evaporation step (V) is primary solvent and this is transferred via line 22 to clathrate dissolution step (VII) to which the solid clathrate from filtration step (III) is also transferred, as shown at 24 on the drawing. In clathrate dissolution step (VII), the solid clathrate is redissolved in the reconstituted primary solvent from step (V).

Upon dissolution of the clathrate, the previously clathrated feed material normally forms a separate liquid phase. The resulting two-phase mixture is then transferred via line 26 to extract separation step (VIII), where the formerly clathrated feed material is separated by settling and decantation or any other suitable method. Here again, as in the case of raffinate separation step (IV), additional means such as those employing an organic secondary solvent, either alone or in conjunction with an organic acid, may be used in supplemental relationship to, or as a part of, step (VIII) for purposes of recovering Werner amine dissolved in the formerly clathrated feed material.

Extract separation step (VIII) normally yields two liquid products—an extract phase consisting essentially of the formerly clathrated feed material and an aqueous phase consisting essentially of reconstituted Werner complex solution. The extract phase is removed via line 28 as one product of the process (the other product being the raffinate removed via line 14) and the reconstituted Werner complex solution is recycled to mixing step (I) through line 4.

The Werner complexes of this invention are made up of at least three constituents. The fundamental unit is a Werner salt, this being a salt of a metal (as one of the constituents) having an atomic number above 12 which is capable of forming coordinate complexes of the Werner type. We have observed that divalent metals having incompletely filled $3d$ of $4d$ electron shells are particularly amenable to Werner complex formation. Examples of some metals fitting this description are maganese, iron, cobalt, nickel, palladium and platinum, of which the first four are preferred because of their good performance characteristics, relatively low cost and ready availability.

The anion of the Werner salt (the second of the aforesaid three constituents may comprise any suitable negative radical, such for example as thiocyanate, isothiocyanate, azide, cyanate, isocyanate, cyanide, sulfate, nitrate, nitrite, chloride, bromide, iodide, phosphate, formate, acetate, and the like. A group of negative radicals found to be particularly effective for the present purposes consists of the monovalent anions, particularly the thiocyanate, isothiocyanate, azide, cyanate, isocyanate and cyanide radicals. However, any anion my be utilized, the salts of which are capable of producing crystalline Werner complexes by coordinate bonding to the Werner amines hereinafter described. Such complexes are described generally in Modern Aspects of Inorganic Chemistry, Emeleus and Anderson, 79–189, Van Nostrand Co. (1946), and also in Textbook of Inorganic Chemistry, vol. X, M. M. J. Sutherland, J. P. Lippincott Co. (1928).

The third constituent of the Werner complexes consists of one or more of the Werner amines. Werner amines, as that term is employed herein, are normally heterocyclic nitrogen bases which are bound to the central metal atom of the Werner complex through coordinate bonds. The operative complexes are mainly of the tetra- and hexa-coordinate types, wherein the metal atom is coordinated with four or six atoms of basic nitrogen. The nitrogen base should be selected so as to give a maximum selective absorption for the particular compound which is to be absorbed into the crystal lattice of the complex. For example, if it is desired to absorb p-xylene, a very suitable nitrogen base is 4-methylpyridine. Not all nitrogen bases are equally effective in forming complexes which will absorb the desired component. For example, the 3-methylpyridine complex with nickel thiocyanate is not as effective as the 4-methylpyridine complex for absorbing p-xylene, presumably because of the steric effects of the 3-methyl group. However, the 3-methylpyridine complex may be used advantageously for absorbing other compounds. The nitrogen bases should therefore be selected by a judicious combination of theoretical reasoning and actual testing of the complexes with the particular mixture to be separated. The over-all molecular dimensions of the nitrogen base should preferably approximate the over-all molecular size of the compound to be absorbed in the complex.

In general, any heterocyclic nitrogen base may be employed which is sufficiently basic to form coordinate complexes with the above-described salts. This includes monocyclic and polycyclic compounds, wherein at least one of the heterocycles contains from one to three hetero-N atoms. In over-all size, the nitrogen base may contain from three to about thirty carbon atoms, preferably from four to fifteen. Interfering functional groups such as —COOH should be absent, but other more neutral, relatively non-coordinating functional groups may be present such as halogen, hydroxyl, nitro, alkoxy, aryloxy, amino, cyano, carboalkoxy, alkanoyl, acetyl, etc., provided such functional groups are compatible with any functional groups present in the mixture of compounds to be separated. Examples of suitable bases include pyridine, substituted pyridines, substituted piperidines, and the like.

A particularly preferred class of organic bases are the heterocyclic, resonance-stabilized bases which contain one to three, but preferably one, hetero-N atoms. Suitable examples are pyridine, the picolines, pteridine, triazole, quinoline, the quinaldines, isoquinoline, pyrimidine, pyrazine, pyridazine, and substituted derivatives of such compounds. Of this preferred class, a sub-group which is particularly versatile and useful comprises the substituted pyridines, and especially the 4-substituted, the 3-substituted, and the 3,4-disubstituted pyridines. These compounds are sufficiently strong bases to form relatively stable Werner complexes, and the resulting complexes are capable of selectively forming clathrates stable at room temperature with a wide variety of aromatic compounds. Suitable substituted pyridines comprise the following:

4-methylpyridine
4-ethylpyridine
4-n-propylpyridine
4-isopropylpyridine
4-n-butylpyridine
4-n-hexylpyridine
4-vinylpyridine
4-fluoropyridine
4-chloropyridine
4-bromopyridine
4-hydroxypyridine
4-hydroxymethylpyridine
4-methoxypyridine
4-aminopyridine
methylisonicotinate
4-cyanopyridine
4-acetylpyridine
4-chloromethylpyridine
3-methylpyridine
3-ethylpyridine
3-n-propylpyridine
3-isopropylpyridine
3-n-butylpyridine
3-vinylpyridine
3-chloropyridine
3-hydroxypyridine
3-methoxypyridine
3-acetylpyridine
3-cyanopyridine
ethyl nicotinate
3,4-dimethylpyridine
3,4-diethylpyridine
3-methyl, 4-ethylpyridine
4-methyl, 3-ethylpyridine
4-methyl, 3-n-hexylpyridine
4-methyl, 3-cyanopyridine
4-chloro, 3-methylpyridine
4-acetyl, 3-methylpyridine
4-methoxy, 3-ethylpyridine
isoquinoline While, as indicated above, the Werner amines suitable for use in the preparation of Werner complexes within the scope of this invention are normally heterocyclic nitrogen bases, it is not essential that this be the case and other nitrogen bases known to form Werner complexes suitable for purposes of our invention can be used in lieu of said heterocyclic bases if desired. Particularly exemplary of nitrogen bases, other than heterocyclic bases, suitable for such purposes, are the substituted primary benzylamines having one or the other of the following general formulas:

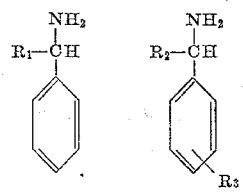

wherein $R_1$ is a primary alkyl group, $R_2$ is H or a primary alkyl group and $R_3$ is a neutral, relatively non-coordinating functional group such as alkyl, halogen, hydroxyl, nitro, alkoxy, aryloxy, cyano, carboalkoxy, alkanoyl, acetyl, etc., which is compatible with any functional groups present in the mixture of compounds to be separated by the particular Werner complex under consideration; $R_3$ may be either polar or not and it can be located on the ortho, meta or para position of the benzene ring.

Some typical compounds fitting the above description are:

α-methylbenzylamine
α-ethylbenzylamine
α-propylbenzylamine
α-butylbenzylamine
α-isobutylbenzylamine
α-amylbenzylamine
α-hexylbenzylamine
α-octylbenzylamine
α-methyl-p-methylbenzylamine
α-methyl-o-methylbenzylamine
α-methyl-p-ethylbenzylamine
α-methyl-p-isopropylbenzylamine
α-methyl-p-t-butylbenzylamine
α-methyl-p-methoxybenzylamine
α-methyl-p-fluorobenzylamine
α-methyl-p-chlorobenzylamine
α-methyl-o-chlorobenzylamine
α-methyl-p-bromobenzylamine
α-methyl-p-iodobenzylamine
α-methyl-m-nitrobenzylamine
α-propyl-p-methylbenzylamine
α-propyl-p-bromobenzylamine
α-isobutyl-p-bromobenzylamine
α-methyl-p-cyclohexylbenzylamine
p-methylbenzylamine
p-bromobenzylamine
p-dimethylaminobenzylamine Many other similar examples of suitable Werner amines could be cited, as will be apparent to those skilled in the art, and the complexes may include only one such amine, or a mixture of two or more may be employed, in which case a mixed complex may be formed.

The preferred Werner complexes of monovalent anion salts of this invention may be designated by the following general formula:

$$A_n X \cdot Z_y$$

wherein X is the metal atom as above defined, Z is the Werner amine, A is the anion as above defined, y is a number from 2 to 6, and n is a number from 1 to 3.

Examples of suitable complexes which may be employed are as follows:

Ni(4MP)$_4$(SCN)$_2$
Cu(4MP)$_4$(SCN)$_2$
Hg(4MP)$_4$(NNN)$_2$
Ni(1-hexylamine)$_6$(SCN)$_2$
Co(pyridine)$_4$(OCN)$_2$
Cd(4MP)$_4$(CN)$_2$
Ag(4MP)$_2$(NNN)
Cr(pyridine)$_4$SO$_4$
Ti(isoquinoline)$_3$(NH$_3$)$_3$(C$_2$O$_4$)$_2$
Ni(4MP)$_4$Cl$_2$
Ni(4MP)$_3$(N$_3$)$_2$ Ni(4-n-propylpyridine)$_4$(SCN)$_2$
Ni(isoquinoline)$_4$Cl$_2$
Ni(4MP)$_4$Br$_2$
Mn(4MP)$_4$(SCN)$_2$
Mn(isoquinoline)$_4$(SCN)$_2$
Zn(4MP)$_4$Cl$_2$ Obviously many other complexes similar to the above could be employed, not all of which would give optimum separation of all mixtures but which should be selected to meet the specific peculiarities of the mixture concerned.

As previously indicated, the primary solvents employed herein contain water plus a suitable nitrogen base of lower volatility than water. The ratio of nitrogen base to water will vary widely depending upon the Werner complex used and the particular nitrogen base. Generally the primary solvent will contain between about 10 and about 90 percent by weight of nitrogen base. The ratio should, of course, be such as to provide the desired solubility of the Werner complex under the service conditions contemplated. Monoethanolamine is a preferred nitrogen base for those primary solvents suitable for the present invention. Operative primary solvent concentrations for monoethanolamine may range between about 10 and about 70 percent by weight. In all cases it is preferred to use sufficient water to render the feed mixture substantially insoluble in the primary solvent.

Other alkanolamines which could be used in place of monoethanolamine include for example, diethanolamine; triethanolamine; 2-amino-n-butanol; 2-amino-2-methyl-1-propanol; 2-(methylamino)ethanol; 2-(ethylamino)ethanol; 2-amino-2-ethyl-1,3-propanediol; 2-amino-2-methyl-1,3-propanediol; and the like. In general any lower alkanolamine containing from about 2 to about 10 carbon atoms, from 1 to 3 amino groups, and from 1 to 3 hydroxyl groups may be employed, including primary, secondary, and tertiary amines. The operative ratios of alkanolamine in the primary solvent may vary widely, e.g., from about 2 percent to 75 percent by weight. Preferred ratios generally fall within the range from about 10 percent to about 70 percent. The greater the concentration of alkanolamine in the solvent, the greater will be the solubility of Werner complex and feed mixture therein.

Where aqueous alkanolamine solutions are employed as primary solvents in our process, it is usually desirable adjust the alkanolamine and Werner complex concentrations so as to assure little or no precipitation of Werner complex or clathrate, except as a result of water dilution, at any temperature to which our system will be exposed therein. While it is true, as those skilled in the art appreciate, that the greater the concentration of alkanolamine and the lower the concentration of Werner complex for a given primary solvent formulation, the lower will be the crystallization temperature, no serious crystallization problem is encountered at normal operating temperatures incident to our process. Furthermore, it is within the scope of our invention to operate under such temperature conditions as to benefit by the crystallization effect due to lower temperatures as well as the crystallization effect due to dilution of the primary solvent in the manner taught herein. While our invention is not limited to any particular operating temperature ranges, we have found that excellent results are achieved in both the clathration and declathration phases of our process when temperatures of from about 0° C. to about 125° C. are employed therein. There is no necessity to maintain a temperature differential between the clathration and declathration steps in the practice of our invention. The above remarks (and temperatures) are equally applicable to the initial preparation of Werner complex solutions (described infra) in the practice of our invention.

The present invention is limited to the use of primary solvent nitrogen bases of lower volatility than water in order to prevent loss of the base in evaporation step (V). It is apparent that without nitrogen bases of such relatively low volatility the method would be inoperative. In addition to their low volatility requirement, the primary solvent nitrogen bases of this invention should preferably contain at least one nonamino functional group (such as, for example, the hydroxy group) of a type conductive to lower amine solubility in typical extract and raffinate products of this invention.

The class of ammonium salts suitable as buffer salts in primary solvents includes substituted, as well as unsubstituted, ammonium salts. Suitable ammonium salts are ammonium thiocyanate, ammonium chloride, ammonium sulfate, ammonium nitrate, ammonium acetate, ammonium citrate, ammonium oxalate, ammonium glycolate, ammonium succinate, and the like. Suitable substituted ammonium salts include methyl ammonium thiocyanate, dimethyl ammonium thiocyanate, ethyl ammonium chloride, ethyl ammonium sulfate, ethanolammonium thiocyanate, ethanolammonium chloride, ethanolammonium sulfate, ethanolammonium cyanate, ethanolammonium cyanide, diethanolammonium thiocyanate, ethanolammonium acetate, and the like. These salts may be used in proportions ranging between about 1% and 40% by weight of the primary solvent, depending upon relative solubilities. Any amounts are effective in some degree, and the preferred proportions generally range between about 15% and 30% by weight.

The preferred ammonium buffer salts are those having an anion equivalent to that of the Werner salt in the system. The preferred Werner salts are thiocyanates and therefore ammonium thiocyanates are favored as buffer salts. It is desirable, if possible, to use an ammonium salt of the same nitrogen base as that in the primary solvent. To illustrate, where ethanolamine is employed in the primary solvent, the preferred buffer salt is ethanolammonium thiocyanate.

There are a number of ways of preparing Werner complex solutions suitable for purposes of this invention. Where the solution includes no buffer salt, it can be prepared by simply dissolving an appropriate Werner complex, such as, for example, Ni(4MP)$_4$(SCN)$_2$, in suitable proportion, in a primary solvent such as aqueous alkanolamine. Where a buffer salt is included in the formulation, the solution can be prepared in the above described manner but with the additional step of dissolving a suitable proportion of the buffer salt, which may be, for example, ethanolammonium thiocyanate, in the mixture. The ammonium buffer salts useful in this invention are either readily available or easily prepared by methods well known to chemists. For example, ethanolammonium thiocyanate is conveniently prepared by simply boiling an aqueous solution of ammonium thiocyanate and ethanolamine, whereby ammonia is volatilized from the mixture to leave behind an aqueous solution of ethanolammonium thiocyanate. If it is desired to recover ethanolammonium thiocyanate from the solution, the water is merely evaporated therefrom.

A preferred way of preparing Werner complex solutions in primary solvents containing buffer salts comprises mixing an aqueous solution of an appropriate ammonium salt, such as ammonium thiocyanate, with a stoichiometric excess of a suitable primary solvent base, such as ethanolamine; adding less than a stoichiometric quantity of a suitable metal carbonate or hydroxide, such as nickel carbonate or hydroxide, to the resulting solution; and then adding a quantity of a suitable Werner amine, such as 4MP, thereto. For a more detailed description of this method see copending U.S. patent application Serial No. 103,625, filed April 17, 1961, now Patent No. 3,161,694.

The preferred ingredient proportions for primary solvents containing buffer salts in solution will vary depending upon the particular ingredient combinations involved. Where the primary solvent consists of water, an alkanolamine, and an alkanolammonium thiocyanate, it has been determined that preferred (although not critical) proportions are those from about 30 to about 60 percent water, from about 30 to 50 percent alkanolamine, and from about 10 to about 30 percent alkanolammonium thiocyanate. A preferred Werner complex solution for clathration purposes consists of a 25 percent solution of $$Ni(4MP)_4(SCN)_2$$

in a primary solvent of the following composition:

| Component: | Weight percent |
|---|---|
| Water | 45 |
| Ethanolamine | 38 |
| Ethanolammonium thiocyanate | 17 |
|  | 100 |

As in the case of the primary solvent ingredient proportions, the preferred concentrations of Werner complexes in Werner complex solutions will vary, depending upon the particular complex and primary solvent ingredients involved. Where the preferred Werner complex, $Ni(4MP)_4(SCN)_2$, is employed in a primary solvent containing water, ethanolamine and ethanolammonium thiocyanate as ingredients, best results are generally achieved with Werner complex concentrations of from about 15 to about 50 percent by weight. Incidentally, all concentrations set forth herein, unless otherwise specified, are on a weight basis.

The amount of complex to be employed, relative to the feed mixture, depends upon its specific capacity for absorbing the particular feed component concerned, and also upon the proportion of that component present in the original mixture, as well as upon the temperature of clathration. The complexes are found in general to be capable of absorbing between about 5% to 70% by weight of absorbable compounds. Optimum efficiency may require that more or less than this "stoichiometric" amount of complex be employed, depending upon its relative capacity for other components in the mixture to be resolved. In general, the amount of complex to be employed may vary between about 0.25 and 20 parts by weight per part of the feed component to be clathrated. Smaller proportions of complex will generally yield a purer extract, while the larger proportions result in more complete recovery of absorbable components from the feed mixture.

As previously indicated, the term "clathrating" as used herein is intended to mean any adsorption or absorption by the herein described Werner complexes of a sorbable organic compound, regardless of the manner in which such sorption takes place. The term "extract" refers to the feed material which is absorbed into the clathrate, thus excluding the nitrogen bases, which are bound by coordinate valences. The term "aromatic" is intended to include all resonance-stabilized, cyclic, unsaturated compounds, which exhibit predominantly substitution rather than addition reactions toward electrophilic reagents (cf. Remick, A. E., Electronic Interpretations of Organic Chemistry, John Wiley, New York, 1943).

A wide variety of feed mixtures can be resolved by the clathration method described above. Said method is operative for separating substantially any mixture of organic compounds wherein the components differ in molecular configuration, and wherein at least one component is substantially aromatic in character. By "substantially aromatic" is meant that at least about 20 percent of the carbon atoms in the molecules to be clathrated are present as structural units of an aromatic ring, the term "aromatic" having the meaning specified above. Any remaining carbon atoms may be present as saturated or unsaturated aliphatic side chains, or saturated or unsaturated non-aromatic ring system. Such compounds may contain a total of from 4 to 60, and preferably from 6 to 20, carbon atoms.

A difference in "molecular configuration," as referred to herein, means a difference in molecular size or shape as a result of differences in (1) the number of atoms per molecule, and/or (2) the arrangement of atoms within the respective molecules, and/or (3) the size of the atoms present in the respective molecules.

Any number and type of functional groups may be present in the feed components, provided that such groups are compatible with the Werner complex employed, i.e., that such groups do not change the chemical character in the Werner complex. Generally excluded are those compounds which are either so acidic as to decompose the Werner complex, or so basic as to displace the Werner amine from the Werner complex. When the compounds are too acidic or too basic, it is feasible to prepare neutral derivatives of such compounds, e.g., salts, esters, ethers, amides, etc., and then effect separation of the neutral derivatives.

Whenever any mixture of compounds is so incompatible with the Werner complex that the normal clathration procedures herein described result primarily in chemical decomposition, change, or disruption of the Werner complex, as opposed to the desired clathration, the contacting of such mixtures with the Werner complex is by definition excluded from the term "clathration" as used herein and in the claims. Functional groups which generally do not disrupt the normal clathration reaction, and may hence be present in the feed components, are as follows: —F, —Cl, —Br, —I, $NO_2$, aryl-$NH_2$, —OR, alkyl-OH, aralkyl-OH, —CO, —CHO, —CN, —SCN, —NCO, —COOR, —COR, —COO-metal, —SR, —$CONH_2$, wherein R is a hydrocarbon radical. Many groups which are generally, though not always, disruptive and to be avoided are —SH, aryl-OH, —COOH, alkyl-$NH_2$, aralkyl-$NH_2$, and the like, unless they are first converted to more nearly neutral derivatives.

Feed mixtures which lend themselves particularly well to separation by the clathration procedure described above are xylene mixtures such as those containing as typical ingredients p-xylene, m-xylene, o-xylene and ethylbenzene. My preferred Werner complex solution previously identified as a 25 percent solution of $$Ni(4MP)_4(SCN)_2$$

in a primary solvent of water, ethanolamine and ethanolammonium thiocyanate in specified proportions has been found to be of great usefulness for the separation of these xylene mixtures. Other mixtures which are separable by the subject clathration procedures include the following, but these examples are by no means exhaustive:

A. Hydrocarbon mixtures:
　o-Ethyl toluene
　p-Ethyl toluene
　o-Ethyl toluene
　m-Ethyl toluene
　p-Ethyl toluene
　m-Ethyl toluene
　Mesitylene
　Pseudocumene
　Cumene
　Mesitylene
　Cumene
　Pseudocumene
　p-Cymene
　p-Diethylbenzene
　m-Cymene
　Mesitylene
　Prehnitene
　Durene
　Durene
　Isodurene
　Prehnitene
　Isodurene
　Cyclohexane
　Benzene
　Methyl-cyclohexane Toluene
Benzene
n-Heptane
Benzene
2,3-dimethyl pentane
Methyl cyclopentane
Benzene
Picene
Chrysene
Picene
1,2,5,6-dibenzanthracene
Tetralin
Naphthalene
Tetralin
Decalin
Diphenyl
Diphenyl methane
Anthracene
Phenanthrene
1-methyl anthracene
1-methyl phenanthrene
Naphthalene
Diphenyl
1-methyl anthracene
2-methyl anthracene
1-methyl naphthalene
2-methyl naphthalene
1-ethyl naphthalene
2-ethyl naphthalene
p-Di-n-propyl benzene
Hexamethyl benzene
o-Cymene
p-Cymene
o-Cymene
m-Cymene
m-Cymene
p-Cymene
p-Methyl styrene
m-Methyl styrene
p-Methyl styrene
o-Methyl Styrene B. Hydrocarbon-non-hydrocarbon mixtures:
2,5-dimethyl furan
Benzene
Anthraquinone
Anthracene
Benzene
Thiophene
2-methyl thiophene
Toluene
o-Xylene
Thiophene C. Non-hydrocarbon mixtures:
o-Methyl toluate
p-Methyl toluate
o-Methyl toluate
m-Methyl toluate
p-Methyl toluate
m-Methyl toluate
1-nitro naphthalene
2-nitro naphthalene
1-amino naphthalene
2-amino naphthalene
Aniline
Nitrobenzene
o-Toluidine
p-toluidine
o-Nitrotoluene
p-Nitrotoluene
o-Dichlorobenzene
p-Dichlorobenzene
o-Chlorotoluene
p-Chlorotoluene
o-Methyl anisole
p-Methyl anisole
Coumarin
Vanillin
Furan
Thiophene
Sodium p-cresylate
Sodium m-cresylate
Potassium terephthalate
Potassium isophthalate
Dimethyl isophthalate
Dimethyl terephthalate
Dimethyl isophthalate
Dimethyl orthophthalate
Sodium o-toluene sulfonate
Sodium p-toluene sulfonate
Sodium-1-methyl-3-naphthalene sulfonate
Sodium-1-methyl-4-naphthalene sulfonate
Estriol
Estrone
Estriol
Estradiol
Picolinic acid
Nicotinic acid
Thymol
Menthol
2-naphthol-6-sodium sulfonate
2-naphthol-8-sodium sulfonate
p-Amino benzaldehyde
o-Amino benzaldehyde
Benzidine
p-Semidine
2,4-dinitro-chloro-benzene
2,5-dinitro-chloro-benzene
Isosafrol
Piperonal
o-Vanillin
Isovanillin
o-Vanillin
Vanillin
o-Phenylene diamine
p-Phenylene diamine
p-Phenetidine
Phenacetin
Isoeugenol
Vanillin
p-Methyl thiophenol
m-Methyl thiophenol
Diazoaminobenzene
p-Aminoazobenzene
N,N-dimethyl aniline
Aniline
Methyl benzoate
Ethyl benzoate
Terephthalonitrile
Isophthalonitrile
p-Tolunitrile
m-Tolunitrile
Methyl salicylate
Methyl p-hydroxy benzoate
p-Methyl acetanilide
m-Methyl acetanilide
p-Aminobenzenesulfonamide
m-Aminobenzenesulfonamide
Sodium anthranilate
Sodium phthalamate
Alpha-picoline
Beta-picoline
2,4-lutidine
2,6-lutidine It will be noted that some of the foregoing compounds are fairly soluble in water, and thus in the primary clathration solvent. In general this does not affect the clathration step, but may necessitate using different techniques for recovering the raffinate and extract products from aqueous solution. Conventional techniques such as solvent extraction, distillation, fractional crystallization, chemical scavenging, precipitation or the like may be utilized for this purpose, the choice of the particular method depending upon the particular compounds involved, as will be understood by those skilled in the art.

As pointed out above in the description of the drawing, there are various techniques which can be used in connection with raffinate separation step (IV) and extract separation step (VIII) to recover dissolved Werner amine from product streams such as the raffinate and extract phases formed in those steps. The problem of Werner amine loss in such raffinate and extract phases is particularly acute in systems employing 4MP as the Werner amine and in which the raffinate and extract products are xylene isomers.

In one technique for reducing or substantially eliminating the loss of Werner amine in the raffinate product, a secondary solvent is added to the Werner complex solution-feed mixture, either before or after the addition of the dilution water thereto, to form a solution with the non-clathratable feed material and the minor amount of Werner amine dissolved therein. Where the feed mixture is composed of aromatic hydrocarbons, such as xylene isomers, the secondary solvent can be a paraffinic or naphthenic hydrocarbon such as pentane, heptane, octane, nonane, or a mixture of hydrocarbons such as an alkylate fraction.

The solution of non-clathrated feed material, Werner amine and secondary solvent is separated from the aqueous phase of the filtrate from step (III) and sent to a secondary solvent recovery step, which may be, for example, a fractional distillation operation, wherein secondary solvent and Werner amine are distilled overhead and the non-clathrated feed material (or raffinate) is recovered as a bottoms product. The secondary solvent-Werner amine overhead product can be recirculated for reuse (as a secondary solvent) in the system, if desired.

Similarly, Werner amine can be substantially recovered from the step (VIII) extract phase by the use of a secondary solvent. Thus a secondary solvent of the above-identified type can be added to the liquid from clathrate dissolution step (VII), after which a solution of the formerly clathrated feed material (or extract), containing a minor amount of Werner amine, and the secondary solvent forms as a distinct liquid phase which can be isolated and sent to a secondary solvent recovery step. Here again, as with the raffinate, the secondary solvent recovery step can be fractional distillation yielding a secondary solvent-Werner amine overhead which may, if desired, be recycled to the system, and a bottoms product consisting essentially of the formerly clathrated, or extract, portion of the feed.

A more complete recovery of the Werner amine from the raffinate and extract process streams can be accomplished by the use of an aqueous carboxylic acid, such as succinic acid, solution in conjunction with a secondary solvent of the above-noted type. When this technique is employed, the procedure with respect to the raffinate treatment is similar to that with respect to the extract treatment. Thus, in either event, the first step is to form a three component solution, in the manner previously set forth, of an appropriate secondary solvent; non-clathrated or formerly clathrated feed material, depending upon whether a raffinate or an extract fraction is involved; and Werner amine. The three component solution will hereinafter, for simplicity's sake, be discussed in terms of a typical formulation in which the secondary solvent is paraffinic hydrocarbon, the feed material is a xylene and the Werner amine is 4MP.

Typically, the three component solution is contacted with an aqueous carboxylic acid solution to produce a two phase mixture, one phase consisting essentially of xylene and paraffinic hydrocarbon and the other phase consisting essentially of the aqueous carboxylic acid solution and 4MP. The aqueous phase is distilled to produce an overhead azetrope of 4MP and water and a bottoms of aqueous carboxylic acid substantially free of 4MP which can be recirculated to the system. The xylene-paraffinic hydrocarbon phase is distilled to remove substantially all of the xylene, as an overhead, leaving substantially pure paraffinic hydrocarbon as a bottoms product.

The aforesaid 4MP-water azeotrope can be contacted with said paraffinic hydrocarbon bottoms product, or other hydrocarbon liquid in which 4MP is soluble such as xylene feedstock, to produce a two phase liquid mixture, one phase comprising substantially pure water, which can be recycled in the system to prevent loss of water from the recirculating aqueous carboxylic acid solution, and the other phase comprising hydrocarbon liquid and 4MP which has been extracted from said azeotrope. The latter phase can be appropriately recirculated to the clathration process to return the recovered 4MP to the system.

A more detailed description of the subject Werner amine recovery method in which a carboxylic acid is employed can be found in copending U.S. patent application, Serial No. 65,641, filed October 28, 1960.

To contribute to a better understanding of this invention, the following examples are presented. It is emphasized, however, that these examples are presented merely for illustrative purposes and that the invention is not limited to the particular embodiment and conditions set forth therein.

*Example I*

This example illustrates the forming and precipitation of clathrates by the water dilution method of this invention, and the effectiveness with which feedstock components are separated by means of said method.

To a 500 ml. 3-necked flask equipped with a stirrer, condenser and thermometer, was added 30 g. of Ni(4-methylpyridine)$_4$-(SCN)$_2$, 60 ml. of ethanolamine and 60 ml. of water. The mixture was warmed to 40° C. and stirred until solution was complete, then 23 ml. of feed xylene were added (clathrate former to p-xylene ratio=10). While maintaining the temperature at 35–40° C. a total of 200 ml. of water were added over a one-hour period. As water addition was made it was noted that a blue solid formed in the mixture. When addition of water was complete the mixture was cooled to 25° C. and stirred for 30 minutes then 30 ml. of isooctane were added and after two minutes of stirring the mixture was filtered. The solid on the filter was decomposed in dilute acid and the released hydrocarbon phase analyzed.

The filtrate consisted of two liquid phases. The upper clear and colorless hydrocarbon phase was separated and subjected to a spectroscopic analysis to determine the amounts of feed xylene components present. The presence of the isooctane did not affect the results of the analysis since that material is optically clear in the xylene wave-length absorption range. The analytical results are shown in the table below.

|  | C$_8$ Aromatic Isomer Distribution | | | | Recovery[1] | |
| --- | --- | --- | --- | --- | --- | --- |
|  | p-xylene | m-xylene | o-xylene | Et. Bz. | p-xylene | m-xylene |
| Feed | 14.8 | 81.2 | 0.6 | 3.3 |  |  |
| Xylene from solid | 60.8 | 34.4 | 0.2 | 4.6 | 80.0 | 8.3 |
| Xylene from filtrate | 2.7 | 94.2 | 0.5 | 2.6 | 13.1 | 82.6 |

[1] Vol. percent isomer charged recovered in that phase.

The data presented in the above table shows that a good xylene resolution was obtained in the procedure described in the example.

*Example II*

This example illustrates certain aspects of my process not included in Example I.

The procedure of Example I was followed through the step of filtering the mixture after the addition of the isooctane thereto.

The filtrate was separated into its two phases and the upper hydrocarbon phase was analyzed as in Example I. The lower aqueous phase is boiled until the 200 ml. of water previously added is evaporated therefrom, as a result of which the primary solvent is regenerated.

The filtrated solid material is added to the regenerated primary solvent and the resulting mixture is heated to about 40° C. The solid dissolves to create two liquid phases—an upper hydrocarbon extract phase and a lower aqueous phase which is reconstituted Werner complex solution. The hydrocarbon phase is separated and analyzed with results substantially the same as those set forth in the table in Example I for its counterpart product in that example.

*Example III*

In this example the same Werner complex and primary solvent base as in Example I are employed. It differs however from Example I in the method of preparing the Werner complex solution and in that a buffer salt is incorporated into said solution.

To a one-liter 3-necked flask equipped with a stirrer, thermometer and reflux condenser (attached via a rubber tube to a graduated cylinder containing 900 ml. $H_2O$) was added 370 g. of 53.5 percent aqueous $NH_4SCN$ solution (2.60 m., 197.9 g. $NH_4SCN$) and 246 g. (4.03 m.) of ethanolamine. The mixture was heated to reflux and reflux continued until evolution of ammonia essentially ceased (total reflux period was 33 min. at 112° C.) Titration of an aliquot from the ammonia receiver showed that 99.2 percent of the theoretical quantity of ammonia had been removed.

The ethanolammonium thiocyanate solution was cooled to 30° C., treated with 58.5 g. (0.6 m.) of

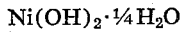

$Ni(OH)_2 \cdot \frac{1}{4} H_2O$ then heated to 100° C. for 10 min. with stirring.

The mixture obtained was a dark blue solution that contained a trace of undissolved nickel hydroxide. Two weight percent Filter-Cel, a diatomaceous earth prowder, was added to the mixture and it was then filtered by means of a Buchner funnel employing filter paper. The filtrate was a clear deep blue solution of a nickelous thiocyanate in the primary solvent, stable to storage at ambient temperatures and having the following composition:

| | m. |
|---|---|
| $Ni(SCN)_2$ | 0.6 |
| Ethanolammonium thiocyanate | 1.4 |
| Ethanolamine | 1.63 |
| Water | 10.90 |

To a 300 ml. three-necked flash equipped with a stirrer, thermometer and condenser was added 68 g. (0.064 g.-atom $Ni^{++}$ of the aforesaid filtrate together with 22.7 ml. ethanolamine, 29.0 ml. water and 24.0 g. (0.256 m.) of 4-methylpyridine. Addition of the 4-methylpyridine resulted in precipitation of a blue Werner complex solid. The mixture was heated to solution (69° C.) then 23 ml. of feed xylene added.

The resulting mixture is permitted to cool to 35–40° C. and a total of 100 ml. of water is added over a one hour period. As water addition is made, a blue solid forms in the mixture. When addition of the water is complete, the mixture is cooled to 25° C. and stirred for 30 min., then 70 ml. of isooctane are added and after ten minutes of stirring the mixture is filtered. The filtrate consists of two phases, an upper hydrocarbon phase rich in m-xylene and a lower aqueous phase. The upper hydrocarbon phase is separated from the aqueous phase as a raffinate product.

The aqueous phase of the filtrate is heated at boiling temperature to evaporate water therefrom and regenerate it as a primary solvent. The boiling is continued until substantially the same amount of water as that added above in the water dilution step is evaporated. The filtered solid material is mixed into the regenerated primary solvent wherein it dissolves to create two liquid phases, an upper hydrocarbon extract phase and a lower aqueous phase consisting of reconstituted Werner complex solution. The hydrocarbon phase is recovered as an extract product rich in p-xylene.

*Example IV*

This example is similar to Example III except that nickelous carbonate is employed instead of nickelous hydroxide in the preparation of the Werner complex solution.

To a one-liter 3-necked flask equipped with a stirrer, thermometer and reflux condenser attached via a rubber tube to a graduated cylinder containing 900 ml. $H_2O$) was added 370 g. of 53.5 percent aqueous $NH_4SCN$ solution (2.60 m., 197.9 g. $NH_4SCN$) and 246 g. (4.03 m.) of ethanolamine. The mixture was heated to reflux and reflux continued until evolution of ammonia essentially ceased (total reflux period was 33 min. at 112° C.). Titration of an aliquot from the ammonia receiver showed that 99.2 percent of the theoretical quantity of ammonia had been removed.

The ethanolammonium thiocyanate solution was cooled to 30° C., treated with 71.1 g. (0.6 m.) of nickelous carbonate, then heated to reflux and reflux continued until evolution of carbon dioxide essentially ceased (total reflux period was 10 minutes at 112° C.).

The mixture obtained contained traces of solid matter and two weight percent Filter-Cel, a diatomaceous earth powder, was added thereto and it was then filtered by means of a Büchner funnel employing filter paper. The filtrate was a clear deep blue solution of nickelous thiocyanate in the primary solvent, stable to storage at ambient temperatures and containing as ingredients, besides the nickelous thiocyanate, ethanolammonium thiocyanate, ethanolamine and water.

To a 300 ml. 3-necked flask equipped with a stirrer, thermometer and condenser was added 68 g. of the aforesaid solution, 22.7 ml. of ethanolamine, 29.0 ml. of water and 24.0 g. (0.256 m.) of 4-methylpyridine. This resulted in a Werner complex solution of nickel tetra(4-methylpyridine)dithiocyanate in a primary solvent consisting of 45% water, 38% ethanolamine and 17% ethanolammonium thiocyanate. The concentration of Werner complex in the solution was 25% corresponding to a primary solvent/Werner complex weight ratio of 3.0.

As in Example III the addition of the 4-methylpyridine to the mixture resulted in precipitation of a blue Werner complex solid. The mixture was heated to solution (69° C.) then 23 ml. of feed xylene were added.

To the resulting mixture a total of 100 ml. of water are added over a one hour period. As water addition is made a blue solid forms in the mixture. When addition of the water is complete the mixture is cooled to about 25° C. and stirred for 30 minutes. The filtrate consists of two phases, an upper hydrocarbon phase, rich in meta-xylene and a lower aqueous phase. The upper hydrocarbon phase is separated from the aqueous phase as a raffinate product.

The aqueous phase of the filtrate is boiled for a sufficiently long period of time to evaporate the water previously added to cause solid precipitation and thus to regenerate it as a primary solvent. The filtered solid material is mixed into the resulting regenerated primary solvent wherein it dissolves to create two liquid phases, an upper hydrocarbon extract phase and a lower aqueous phase consisting of reconstituted Werner complex solution. The hydrocarbon phase is recovered as an extract product rich in para-xylene.

Following are additional examples showing the operation of my process with various Werner complex solutions and feed mixtures.

*Example V*

A quantity of 35 percent aqueous ammonium cyanide solution containing 2.6 m. of ammonium cyanide is mixed with 5.2 m. of 2-amino-2-methyl-1-propanol. Upon admixture of the two liquids the following reaction takes place in the resulting solution:

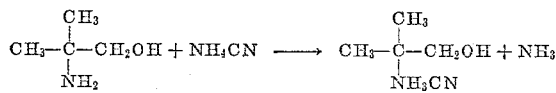

The reaction mixture, now containing water, 2-amino-2-methyl-1-propanolammonium cyanide and ammonia is refluxed to expel the ammonia. To the refluxed mixture free of ammonia there is added 0.7 m. of manganous carbonate which stoichiometrically reacts with a portion of the 2-amino-2-methyl-1-propanolammonium cyanide to yield a solution of 0.7 m. of $Mn(CN)_2$ and 1.2 m. of 2-amino-2-methyl-1-propanolammonium cyanide in a 2-amino-2-methyl-1-propanol, water and carbon dioxide solution. The solution is refluxed to expel $CO_2$.

To the refluxed solution is added 2.8 m. of isoquinoline, together with sufficient water and 2-amino-2-methyl-1-propanol to yield a 35 percent solution of $Mn(isoquinoline)_4(CN)_2$ in a primary solvent of the following composition:

| Component: | Weight percent |
|---|---|
| Water | 46 |
| 2-amino-2-methyl-1-propanol | 40 |
| 2-amino-2-methyl-1 - propanolammonium cyanide | 14 |
| | 100 |

A mixture of m-cymene and mesitylene is contacted with the above-identified Werner complex solution at a Werner complex/mesitylene weight ratio of 10. Dilution water is slowly added to the resulting mixture with agitation until a precipitation of solid material is substantially complete. The solid material is filtered from the mixture. The filtrate consists of two phases, an upper hydrocarbon phase, rich in m-cymene and a lower aqueous phase. The upper hydrocarbon phase is separated from the aqueous phase as a raffinate product.

The aqueous phase of the filtrate is heated at boiling temperature for a sufficient period of time to evaporate the dilution water therefrom and regenerate it as a primary solvent. The filtered solid material is mixed into the regenerated primary solvent wherein it dissolves to create two liquid phases, an upper hydrocarbon extract phase and a lower aqueous phase consisting of reconstituted Werner complex solution. The hydrocarbon phase is recovered as an extract product rich in mesitylene.

*Example VI*

A quantity of 55% aqueous ammonium acetate solution containing 3 m. of ammonium acetate is mixed with 3.5 m. of a-amino-n-butanol; upon admixture of the two liquids the following reaction takes place in the resulting solution:

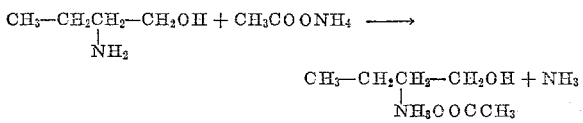

The reaction mixture, now containing water, 2-amino-1-butanolammonium acetate and ammonia is refluxed to expel the ammonia. To the refluxed mixture, free of ammonia, there is added 0.9 m. of cobaltous hydroxide which stoichiometrically reacts with a portion of the 2-amino-1-butanolammonium acetate to yield a solution of 0.9 m. of cobaltous acetate and 1.2 m. of 2-amino-1-butanolammonium acetate in a 2-amino-n-butanol and water mixture.

To the aforesaid solution is added 3.6 m. of 4-ethyl-pyridine together with sufficient water and 2-amino-n-butanol to yield a 20% solution of

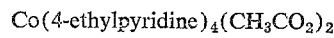

in a primary solvent of the following composition:

| Component: | Weight percent |
|---|---|
| Water | 50.0 |
| 2-amino-n-butanol | 38.8 |
| 2-amino-1-butanolammonium acetate | 11.2 |
| | 100.0 |

A mixture of m-ethyl toluene and p-ethyl toluene is contacted with the above-identified Werner complex solution at a Werner complex/p-ethyl toluene weight ratio of 9.5. Dilution water is slowly added with agitation to the resulting mixture as a result of which solid material precipitates out of solution. The dilution is continued until the precipitation of solid material substantially ceases. The solid material is filtered from the mixture. The filtrate consists of two phases, an upper hydrocarbon phase rich in m-ethyl toluene and a lower aqueous phase. The upper hydrocarbon phase is separated from the aqueous phase as a raffinate product.

The aqueous phase of the filtrate is boiled for a sufficient period of time to evaporate substantially all of the dilution water added thereto and to regenerate it as a primary solvent. The filtered solid material is mixed into the regenerated primary solvent wherein it dissolves to create two liquid phases, an upper hydrocarbon extract phase and a lower aqueous phase consisting of reconstituted Werner complex solution. The hydrocarbon phase is recovered as an extract product rich in p-ethyl toluene.

*Example VII*

A quantity of 45% aqueous ammonium cyanate solution containing 2.6 m. of ammonium cyanate is mixed with 4 m. of 2-(methylamino) ethanol. Upon admixture of the two liquids the following reaction takes place in the resulting solution:

The reaction mixture, now containing water, 2-(methylamino) ethanolammonium cyanate and ammonia is refluxed to expel the ammonia. To the refluxed mixture free of ammonia there is added 1 m. of ferrous carbonate which stoichiometrically reacts with a portion of the 2-(methylamino) ethanolammonium cyanate to yield a solution of 1 m. of ferrous cyanate and 0.6 m. of 2-(methylamino) ethanolammonium cyanate in a 2-(methylamino) ethanol, water and carbon dioxide solution. The solution is refluxed to expel $CO_2$.

To the aforesaid solution is added 4 m. of pyridine, together with sufficient water and 2-(methylamino) ethanol to yield a 20% solution of $Fe(pyridine)_4(CNO)_2$ in a primary solvent of the following composition:

| Component: | Weight percent |
|---|---|
| Water | 76.6 |
| 2-(methylamino) ethanol | 20.0 |
| 2-(methylamino) ethanolammonium cyanate | 3.4 |
| | 100.0 |

A mixture of biphenyl and diphenyl methane is contacted with the above-identified Werner complex solution at a Werner complex/biphenyl weight ratio of 10. Dilution water is added to the resulting mixture with agitation as a result of which solid material precipitates out of solution. The addition of the dilution waater is continued until the precipitation is substantally complete. The solid material is filtered from the mixture. The filtrate consists of two phases, an upper hydrocarbon phase rich in diphenyl methane and a lower aqueous phase. The upper hydrocarbon phase is separated from the aqueous phase as a raffinate product.

The aqueous phase of the filtrate is boiled for a period of time sufficient to evaporate the dilution water previously added and regenerate it as a primary solvent. The filtered solid material is mixed into the regenerated primary solvent wherein it dissolves to create two liquid phases, an upper hydrocarbon phase and a lower aqueous phase and a lower aqueous phase consisting of reconstituted Werner complex solution. The hydrocarbon phase is recovered as an extract product rich in biphenyl.

*Example VIII*

A quantity of 50% aqueous ammonium chloride solution containing 2.6 m. of ammonium chloride is mixed with 4.5 m. of diethanolamine. Upon admixture of the two liquids the following reaction takes place in the resulting solution:

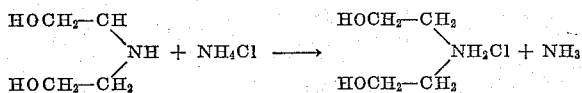

The reaction mixture, now containing water, diethanolamine, diethanolammonium chloride and ammonia is refluxed to expel the ammonia. To the refluxed mixture free of ammonia there is added 0.6 of nickelous carbonate which stoichiometrically reacts with a portion of the diethanolammonium chloride to yield a solution of 0.6 m. of nickelous chloride and 1.4 m. of diethanolammonium chloride in a diethanolamine, water and carbon dioxide solution. The solution is refluxed to expel carbon dioxide.

To the aforesaid solution is added 2.4 m. of 4-chloro, 3-methyl pyridine, together with sufficient water and diethanolamine to yield a 25% solution of Ni-(4-chloro, 3-methylpyridine)$_4$-(Cl$_2$)$_2$ in a primary solvent of the following composition:

| Component: | Weight percent |
|---|---|
| Water | 57.2 |
| Diethanolamine | 30.0 |
| Diethanolammonium chloride | 12.8 |
| | 100.0 |

A mixture of durene and isodurene is contacted with the above-identified Werner complex solution at a Werner complex/durene weight ratio of 10. Dilution water is added with agitation to the resulting mixture as a result of which solid material precipitates out of solution. The addition of the dilution water is continued until the precipitation substantially ceases. The solid material is filtered from the mixture. The filtrate consists of two phases, an upper hydrocarbon phase rich in isodurene and a lower aqueous phase. The upper hydrocarbon phase is separated from the aqueous phase as a raffinate product.

The aqueous phase of the filtrate is boiled for a sufficient period of time to evaporate substantially all of the dilution water previously added thereto in the solid precipitation step. This regenerates the aqueous phase as a primary solvent. The filtered solid material is mixed into the regenerated primary solvent wherein it dissolves to create two liquid phases, an upper hydrocarbon extract phase and a lower Werner complex solution phase. The hydrocarbon phase is recovered as an extract product rich in durene.

It will be apparent to those skilled in the art that my process can be carried out with a great number and variety of Werner complex solutions for purposes of separating many types of difficultly separable compounds from their common mixtures by merely performing the process taught herein using different combinations of the various Werner complex and primary solvent ingredients and feed materials within the scope of the invention.

I claim:

1. A method for resolving a feed mixture of organic compounds differing in molecular configuration comprising: (1) forming a solution of a Werner complex in a primary solvent comprising an aqueous solution of nitrogen base of lower volatility than water; (2) effecting intimate contact of said solution with said feed mixture; and (3) diluting the resulting mixture with water to effect precipitation of a solid clathrate of at least one component of said feed mixture with said Werner complex.

2. A method of resolving a feed mixture of organic compounds differing in molecular configuration and wherein at least one component is substantially aromatic, comprising: (1) forming a solution of a Werner complex comprising a salt of a metal of atomic number above 12 coordinated with a Werner amine in a primary solvent comprising an aqueous solution of nitrogen base of lower volatility than water; (2) mixing the resulting solution with said mixture; (3) adding water to the resulting mixture to effect precipitation of solid clathrate of at least one substantially aromatic component of said feed mixture with said Werner complex; (4) separating said solid clathrate from the resulting mixture to leave two liquid phases, one comprising primary solvent in diluted form and the other comprising nonclathrated feed mixture material; (5) separating said two liquid phases; (6) treating the primary solvent phase in such fashion as to remove substantially all of the dilution water therefrom and to regenerate it as a primary solvent; and (7) dissolving solid clathrate from step (4) in the regenerated primary solvent from step (6) to free the clathrated feed mixture material therefrom, which forms as one phase, and regenerated Werner complex solution which forms as a second phase.

3. A method for resolving a mixture of di-substituted benzene isomers including a para-isomer, comprising: (1) forming a solution of a Werner complex consisting of a salt selected from the group consisting of the thiocyanates, isothiocyanates, cyanates, isocyanates, cyanides, and azides of metals selected from the group consisting of manganese, iron, cobalt and nickel, coordinated with a heterocyclic base, in a primary solvent comprising an aqueous solution of nitrogen base of lower volatility than water; (2) mixing the resulting Werner complex solution with the mixture of disubstituted benzene isomers; (3) adding water to the resulting mixture to effect precipitation of a solid clathrate of said para-isomer from said mixture of disubstituted benzene isomers, with said Werner complex; (4) separating said solid clathrate from the resulting mixture to leave two liquid phases, one comprising primary solvent diluted with water and the other comprising raffinate material from said mixture of disubstituted benzene isomers; (5) substantially separating said liquid phases; (6) heating the diluted primary solvent phase to evaporate substantially all of the dilution water therefrom and regenerate it as primary solvent; (7) dissolving solid clathrate from step (4) in the regenerated primary solvent from step (6) to free said para-isomer therefrom, which forms as an extract phase, and regenerated Werner complex solution, which forms as a separate phase; and (8) separating said extract phase from the regenerated Werner complex solution phase.

4. The method of claim 3 in which the primary solvent nitrogen base is an alkanolamine solution.

5. The method of claim 3 in which the primary solvent is an aqueous solution of a nitrogen base of lower volatility than water having dissolved therein a minor proportion of a water soluble ammonium salt.

References Cited by the Examiner

UNITED STATES PATENTS

| | | | |
|---|---|---|---|
| 2,798,891 | 7/57 | Schaeffer | 260—674 |
| 2,849,511 | 8/58 | Schaeffer et al. | 260—674 |
| 2,905,730 | 9/59 | Ray et al. | 260—674 |
| 3,029,300 | 4/62 | Schaeffer | 260—674 |
| 3,043,892 | 7/62 | Schaeffer | 260—674 |
| 3,049,575 | 8/62 | Schaeffer | 260—674 |

ALPHONSO D. SULLIVAN, *Primary Examiner.*